United States Patent Office 2,700,037
Patented Jan. 18, 1955

2,700,037

PROCESS FOR THE MANUFACTURE OF MONO-ACYL ACETYL COMPOUNDS OF PRIMARY AMINES

Max Schmid, Riehen, and Eduard Moser, Basel, Switzerland, assignors to Ciba Limited, Basel, Switzerland, a Swiss firm No Drawing. Application April 28, 1950,
Serial No. 158,937

Claims priority, application Switzerland May 3, 1949

10 Claims. (Cl. 260—207)

This invention relates to valuable new condensation products and process for their manufacture.

The process of manufacture of the present invention is by reacting an acetoacetyl compound of a primary amine which contains at least one water-solubilizing acid group, with an acylating agent which is derived from an acid with at least three carbon atoms and if desired reacting the product obtained with a hydrolyzing agent for splitting off one or more acetyl groups per molecule as the case may be.

The acetoacetyl compounds serving as starting materials for the present process may be derived from primary amines which contain one or more, for example two, amino groups. Such amines can contain the amino group or amino groups together with acid groups combined as sole reactive substituents in a hydrocarbon radical which is otherwise unsubstituted or at the most contains substituents which are comparatively unreactive. The radicals containing the amino groups can for example belong to the aliphatic, aromatic or heterocyclic series and may for example contain as aromatic nuclei benzene or naphthalene nuclei or also the groupings derived therefrom such as diphenyl or stilbene radicals. Heterocyclic primary amines include for example dehydrothiotoluidine, 2-aminothiazole, 2-aminobenzothiazole and also 2-amino-6-methoxy-benzothiazole. These amines must in addition fulfil the condition indicated above that they contain at least one water-solubilizing acid group. As acid groups of the specified type there are concerned for example the sulfonic acid group, the sulfonic acid amide group and the carboxyl group. For one radical of a mono- or diamine one or more of the same or different groups of this type may be present. It is to be understood that the term "water-solubilizing acid group" includes the water-soluble salts, such as alkali metal salts, ammonium salts etc., formed by such groups. Furthermore other substituents may be present which do not take part in the reaction, such as alkyl or alkoxy groups, halogens, nitro-groups or hydroxyl groups.

As examples of amines which are the basis of the starting materials for the present process there may be mentioned for example 1-aminobenzene-2-, -3- or -4-sulfonic acid, 1-amino-2-methoxybenzene-5-sulfonic acid, 1-amino-4-methylbenzene-2-sulfonic acid, 1-amino-4-methylbenzene-3-sulfonic acid, 1-amino-2-methylbenzene-4-sulfonic acid, 1-amino-2-methylbenzene-5-sulfonic acid, 1-amino-3-chlorobenzene-6-sulfonic acid, 1-amino-2-chlorobenzene-5-sulfonic acid, 1-amino-4-chlorobenzene-2-sulfonic acid, 1-amino-4-chlorobenzene-5-sulfonic acid, 1-amino-4-nitrobenzene-6-sulfonic acid, 1-amino-3-nitrobenzene-6-sulfonic acid, 1-aminobenzene-2:4-disulfonic acid, 1-aminobenzene-2:5-disulfonic acid, 1-amino-2:5-dichlorobenzene-4-sulfonic acid, 4- and 5-sulfonanthranilic acid, 1-naphthylamine-2-sulfonic acid, 1-naphthylamine-4-sulfonamide, 1-naphthylamine-5-sulfonamide, 1-naphthylamine-6-sulfonamide, 1-naphthylamine-7-sulfonamide, 1-naphthylamine-8-sulfonamide, 1-naphthylamine-4:8-disulfonic acid, 1-naphthylamine-3:6-disulfonic acid, 2-naphthylamine-6-sulfonic acid, 2-naphthylamine-4:8-disulfonic acid, 2-naphthylamine-6:8-disulfonic acid, 2-naphthylamine-3:6-disulfonic acid, 2-naphthylamine-5:7-disulfonic acid, 4:4'-diaminostilbene-2:2'-disulfonic acid, 4:4'-diaminodiphenyl-2:2'-disulfonic acid, 4:4'-diaminodiphenyl-3:3'-disulfonic acid, 4:4'-diaminodiphenyl-2-sulfonic acid.

If amino compounds of the benzene, naphthalene or heterocyclic series are employed which contain together with solubilizing groups such as sulfonic acid or carboxylic acid groups also hydroxyl groups, it is often to be recommended to render the OH-groups inactive and finally by splitting to render the couplings again possible. The following compounds can for example be used with advantage in the form of their O-esters for example para-toluene sulfonic acid esters: 2-amino-5-hydroxynaphthalene-7-sulfonic acid, 2-amino-8-hydroxynaphthalene-6-sulfonic acid, 1-amino-8-hydroxynaphthalene-3:6-disulfonic acid, 1-amino-8-hydroxynaphthalene-2:4-disulfonic acid, 2-(para-aminobenzoyl)-amino-5-hydroxynaphthalene-7-sulfonic acid, 2-(meta-aminobenzoyl)-amino-8-hydroxynaphthalene-6-sulfonic acid, 2-(para-aminophenyl)-amino-5-hydroxynaphthalene-7-sulfonic acid, 2-(para-aminophenyl)-amino-8-hydroxynaphthalene-6-sulfonic acid.

Furthermore such amines may also contain azo groups so long as the condition is fulfilled that in addition to the primary amino group an acid group is present at any suitable position in the molecule, for example in another nucleus attached by an azo group to the nucleus containing the amino group. As an example 4'-amino-4-hydroxy-1:1'-azobenzene-3-carboxylic acid may be mentioned.

The acetoacetyl compounds of the above-mentioned amines serving as starting materials for the present process can be produced by processes known per se. In many cases they are easily obtainable by reaction of the amines with diketene in aqueous, for example neutral or slightly acid medium. Some of the acetoacetyl compounds obtained are deposited during the reaction itself; in the case of others it may be of advantage to recover the products by salting out or evaporation.

As acylating agents which are specified according to the present process for reaction with the above-mentioned acetoacetyl compounds, there come into consideration especially such functional derivatives of acids containing at least three carbon atoms as are especially reactive, for example the anhydrides or in particular the acid halides, suitably acid chlorides. These derivatives may be derived from aliphatic, aromatic or heterocyclic mono- or dicarboxylic acids. Advantageous results are obtained especially with the application of aromatic mono- and dicarboxylic acids. As examples may be mentioned chlorides of higher fatty acids such as stearic acid chloride, chlorides of five-membered heterocyclic carboxylic acids containing only one hetero atom such as furane carboxylic acid chlorides, or chlorides of aromatic or of araliphatic carboxylic acids such as the chlorides of benzoic acid, of 2-, 3- or 4-chlorobenzene-1-carboxylic acid, 2-, 3- or 4-methoxy- or ethoxybenzene-1-carboxylic acid, or 3- or 4-nitrobenzene-1-carboxylic acid, naphthalene-1- or -2-carboxylic acid or of cinnamic acid. Among the acylating agents derived from dicarboxylic acids may be mentioned the dichloride of diphenyl-4:4'-dicarboxylic acid or of iso- or terephthalic acid.

In order to carry out the reaction for example the acetoacetyl compounds may be dissolved in a suitable, advantageously aqueous medium, for example having a weakly or moderately alkaline reaction and the acylating agent, which may be dissolved in a convenient non-aqueous medium, then added. With advantage at the same time a corresponding quantity of an acid-binding agent, for example an alkali carbonate or hydroxide solution, is added so that the reaction medium does not become acid, for example remains weakly alkaline. In many cases it is also of advantage to employ a certain excess, for example 10-30 per cent. excess of acylating agent, since in reactions of the specified type some loss of acylating agent can scarcely be avoided. The reaction can in many cases be carried out at low temperatures, for example in the region of 0° C., and completed at moderate temperatures, for example at room temperature or somewhat higher temperature, but advantageously not above 30° C.

Whereas in the case of the application of acetoacetyl compounds of monoamines, such acylating agents may be employed as are derived from mono- or polyvalent acids, for example mono- or dicarboxylic acids, in the case of the application of aceto-acetyl compounds of diamines it is of advantage to employ as acylating agents derivatives of monocarboxylic acids.

In a surprising way the reaction in the case of the present invention proceeds very uniformly in such a manner that the acylation takes place on the carbon atom which is located between the two carbonyl groups of the aceto-acetyl radical. The products obtained thus constitute acyl-aceto-acetyl compounds of primary amines which contain at least one water-solubilizing acid group.

According to a further feature of the present invention the acyl-acetoacetyl compounds obtained are treated with hydrolyzing agents whereby the acyl group remains in the molecule whereas one or more acetyl groups as the case may be are removed from the molecule. Hydrolyzing agents of alkaline action can be employed with advantage. In many cases the use of ammonia as hydrolyzing agent gives good results. The hydrolysis can if desired be carried out immediately subsequent to the first reaction set forth above. In order to obtain pure compounds it may be of advantage to effect a preliminary separation of the acyl-acetoacetyl compounds obtained in the first stage of the process.

The compounds obtained, with or without hydrolysis, may for example correspond to the general formulae:

(i)
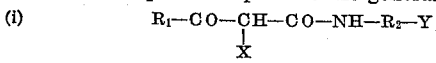

(ii)
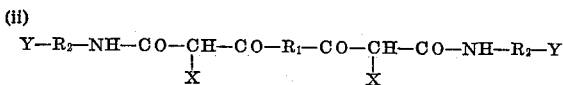

(iii)
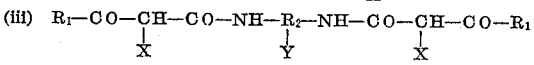

in which in (i) R₁—CO— indicates the radical of a carboxylic acid, in (ii) —CO—R₁—CO— indicates the radical of a dicarboxylic acid and in (iii) each R₁—CO— indicates the radical of a monocarboxylic acid, all the said acids containing at least three carbon atoms, each X indicates hydrogen or the acetyl group and each Y a water-solubilizing acid group and in (i) —NH—R₂—Y stands for the radical of an amine, in (ii) each —NH—R₂—Y stands for the radical of a cyclic amine and in (iii)

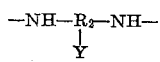

stands for the radical of a cyclic diamine.

Compounds of the above specified type in which X indicates hydrogen, which are accordingly obtained by hydrolysis of the corresponding compounds containing an acetyl group in the same position, are capable of coupling at the position indicated by X and can serve as intermediate products for the manufacture of azo dyestuffs.

The following examples illustrate the invention, the parts and percentages being by weight unless otherwise stated and the relation between parts by weight and parts by volume being the same as that between the kilogram and the liter:

*Example 1*

25.7 parts of 1-acetoacetylaminobenzene-4-sulfonic acid are dissolved in 150 parts of water with 13.5 parts of 30 per cent. sodium hydroxide solution and with good stirring at 0–5° C. within three hours 16.8 parts of benzoyl chloride and at the same time about 17 parts of 30 per cent. sodium hydroxide solution added in portions in such a manner that the reaction medium continuously reacts slightly alkaline to phenolphthalein. Then stirring is continued at 0–5° C. for a further two hours. The condensation product of the probable formula

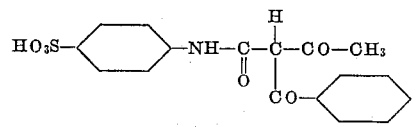

is salted out from the solution with 20 per cent. of sodium chloride calculated on the volume of the liquid. For hydrolysis it is dissolved in 180 parts of 10 per cent. ammonium hydroxide solution and warmed for two hours at 40–45° C. The 1-benzoylacetylamino benzene-4-sulfonic acid is precipitated by pouring into it about 14 parts of 30 per cent. hydrochloric acid until the reaction is slightly acid to Congo and then filtered. The sodium salt of this sulfonic acid can be recrystallized from water. The formula of this compound is the same as that given above except for the —CO—CH₃ group which is replaced by a hydrogen atom.

If there is employed instead of the benzoyl chloride 21 parts of ortho-, meta- or para-chlorobenzoyl chloride, the corresponding ortho-, meta- or para-chlorobenzoyl acetyl-aminobenzene-4-sulfonic acids are obtained. Likewise instead of the 1-acetoacetylaminobenzene-4-sulfonic acid for example the 1-acetoacetylamino-2-chlorobenzene-4-sulfonic acid or the 1-acetoacetylamino-2-methoxybenzene-5-sulfonic acid can be employed, which latter leads to the compound of the formula

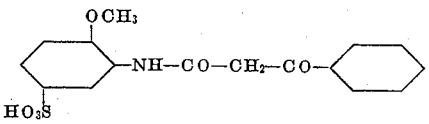

The 1-acetoacetylaminobenzene-4-sulfonic acid used in the present example can be prepared as follows:

195 parts of sodium sulfanilate are dissolved in 500 parts of water and to this solution at 10–15° C. 85 parts of dikentene added in portions within 30 minutes. Stirring is carried out at this temperature until the odor of diketene has disappeared and no more diazotizable base can be detected in a test portion. Then the clear colorless solution is evaporated in vacuum to dryness. The 1-acetoacetylaminobenzene-4-sulfonic acid is thus obtained in the form of its sodium salt as a white crystalline powder. The yield practically corresponds to the theoretical.

*Example 2*

50 parts of 1-acetoacetylaminobenzene-4-sulfonic acid are dissolved in 150 parts of water with 27 parts of 30 per cent. sodium hydroxide solution and in the course of three hours with good stirring at 5–10° C. a solution of 25 parts of terephthalic acid dichloride in 150 parts of chlorobenzene and at the same time about 34 parts of 30 per cent. sodium hydroxide solution introduced in portions in such a manner that the reaction medium continuously reacts slightly alkaline to phenol phthalein. The condensation is carried on for a further three hours and then the chlorobenzene is separated from the aqueous solution in a separating funnel. The aqueous solution is treated with 20 per cent. of its volume of sodium chloride and the precipitated condensation product of the probable formula

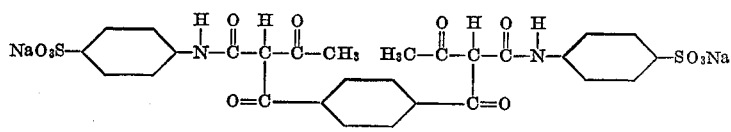

filtered off. For hydrolysis it is dissolved in 300 parts of 10 per cent. ammonium hydroxide solution and heated for two hours to 45–50° C. Then 60 parts of sodium chloride are added and the 1:1′-terephthaloylacetylamino-benzene-4:4′-disulfonic acid filtered off. For purification it can be dissolved in water with sodium carbonate and from the solution having an alkaline reaction to Brilliant Yellow, the product precipitated again with sodium chloride.

Similar products are obtained when instead of 1-acetoacetylaminobenzene-4-sulfonic acid the 1-acetoacetyl-aminobenzene-2- or -3-sulfonic acid is used.

The new terephthaloylaminobenzene sulfonic acids in the form of the free acids and their alkali salts are white compounds. The alkali salts are easily soluble in water.

Example 3

53.8 parts of 4:4'-di-(acetoacetylamino)-stilbene-2:2'-disulfonic acid are dissolved in 350 parts of water with 27 parts of 30 per cent. sodium hydroxide solution. With good stirring and cooling with ice water to 5–10° C. in the course of three hours a solution of 45 parts of meta-nitrobenzoyl chloride and at the same time about 34 parts of 30 per cent. sodium hydroxide solution are introduced in portions in such a manner that the reaction medium continuously reacts slightly alkaline to phenol phthalein. Stirring is then continued for a further 2 hours at 0° C. and the condensation product of the probable formula

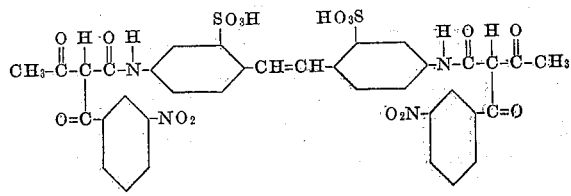

precipitated by acidification with hydrochloric acid to a slightly acid reaction to Congo.

For hydrolysis it is dissolved in 500 parts of 10 per cent. ammonium hydroxide solution and the whole heated for two hours to 40–45° C. By addition of 100 parts of sodium chloride the diammonium salt of the 4:4'-di-(meta-nitrobenzoylacetyl)-aminostilbene-2:2'-disulfonic acid precipitates as a yellow powder. It is purified by dissolving in water and precipitating with sodium chloride. If in this example meta-nitrobenzoyl chloride is replaced by benzoyl chloride the compound of the formula

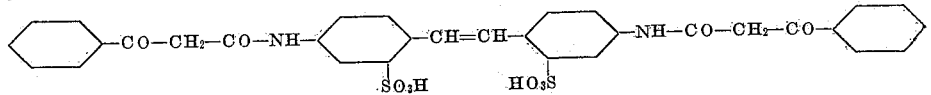

is obtained.

If there is used instead of the meta-nitrobenzoylchloride a solution of para-nitrobenzoyl chloride in acetone, the 4:4'-di-(para-nitrobenzoylacetyl)-aminostilbene-2:2'-disulfonic acid is obtained.

The 4:4'-di-(acetoacetylamino)-stilbene-2:2'-disulfonic acid used in the present example can be prepared as follows:

370 parts of 4:4'-diaminostilbene-2:2'-disulfonic acid are dissolved in 3000 parts of water at 40° C. with sodium carbonate to a neutral solution. The latter is cooled to 10° C. and at this temperature with good stirring 170 parts of diketene introduced in portions within two hours. In this operation the temperature rises to 20–25° C. and the condensation product after a short time separates in lustrous pale yellow crystals. Stirring is continued for six hours at room temperature. After this time no diazotizable base can be detected in a test portion of the reaction mixture. The precipitated condensation product is filtered, pressed off and dried in vacuum at 60–70° C. The 4:4'-di-(acetoacetylamino)-stilbene-2:2'-disulfonic acid in the form of its disodium salt is thus obtained in very good yield as a light colored crystalline product.

Example 4

47.7 parts of 2-acetoacetylamino-5-(para-toluenesulfo)-hydroxynaphthalene-7-sulfonic acid are dissolved in 300 parts of water and 27 parts of 30 per cent. sodium hydroxide solution and in the course of one hour with good stirring and cooling with ice water 22 parts of melted meta-nitrobenzoyl chloride added in portions at 0–5° C. At the same time about 10 parts of 30 per cent. sodium hydoxide solution are continuously introduced in such a manner that the reaction medium always reacts alkaline to phenol phthalein. Then stirring is continued for a further two to three hours at 0–5° C. The clear solution is treated with 15 per cent. of its volume of common salt. The condensation product of the probable formula

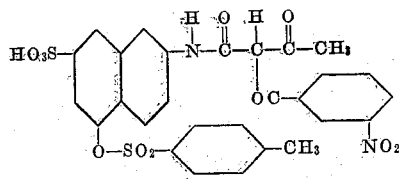

is precipitated in a somewhat oily form. It is purified by dissolving in water and reprecipitating with sodium chloride. For hydrolysis 62.6 parts are dissolved in 600 parts of 10 per cent. ammonia solution and heated for 2 hours to 40–50° C. The 2-meta-nitrobenzoylacetylamino-5-(para-toluenesulfo)-hydroxynapthalene-7-sulfonic acid is precipitated by addition of 120 parts of sodium chloride. For purification the sulfonic acid is dissolved in 500 parts of water, about 12 parts of 30 per cent. hydrochloric acid added to produce a weakly acid reaction to Congo and the free sulfonic acid is precipitated by addition of 60 parts of sodium chloride. When dry it forms a brownish powder which is of good solubility in warm water.

Example 5

68.2 parts of 4-acetoacetylamino-4'-hydroxy-1:1'-azobenzene-3'-carboxylic acid are dissolved in 280 parts of water and 27 parts of 30 per cent, sodium hydroxide solution and in the course of two hours with good stirring at 0–5° C. 34 parts of benzoyl chloride and at the same time about 34 parts of 30 per cent. sodium hydroxide solution are added in portions in such a manner that the reaction medium continuously reacts weakly alkaline to phenol phthalein. Stirring is then continued for a further two hours at 0–5° C. The condensation product of the probable formula

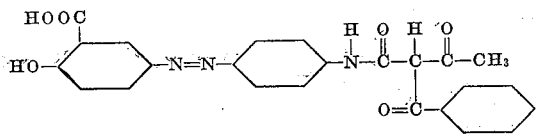

is salted out with 20 per cent. of sodium chloride calculated on the volume of the liquid.

For hydrolysis it is dissolved in 400 parts of 10 per cent. ammonium hydroxide solution and the whole heated for two hours to 40–45° C. The 4-benzoylacetylamino-4'-hydroxy-1:1'-azobenzene-3'-carboxylic acid is salted out by addition of 40 parts of glacial acetic acid and 50 parts of sodium chloride, filtered and dried. It forms a brownish-yellow powder.

The starting material employed in the present example can be prepared in the following manner:

257 parts of 4-amino-4'-hydroxy-1:1'-azobenzene-3'-carboxylic acid are dissolved in 2000 parts of water with the addition of caustic soda solution with the production of a neutral reaction. 85 parts of diketene are introduced into the solution in portions at room temperature within one hour. The temperature rises in this operation to 25–30° C. and after a short time the condensation product commences to separate as a yellow crystalline body. Stirring is continued until the odor of diketene has disappeared which is the case after 4–5 hours. After this time 4-amino-4'-hydroxy-1:1'-azobenzene-3'-carboxylic acid can no longer be detected in a test portion of the reaction mixture. The whole is now heated to 50–60° C. whereby the precipitated product for the most part passes into solution and 100 parts of sodium chloride are added followed by cooling to 10° C. and filtration of the precipitated condensation product which is washed with 5 per cent. sodium chloride solution and dried in vacuum at 60–70° C.

Example 6

36.1 parts of 4-acetoacetylamino-1:1'-azobenzene-4'-sulfonic acid are dissolved in 100 parts of water at 0–5° C. with 22 parts of 30 per cent. sodium hydroxide solution and 17 parts of benzoyl chloride are introduced in portions with good stirring at 0–5° C. within ½ hour, the reaction being maintained continuously alkaline to phenol phthalein by the addition also in portions of about 17 parts of 30 per cent. sodium hydroxide solution. Stirring is continued for a further three hours at 0–5° C. and then hydrochloric acid added to produce a reaction which is just acid to Congo whereupon one third of the volume, that is to say about 50 parts of 20 per cent. ammonia solution, is poured in. The clear solution is stirred for 5 hours at 50° C. and the ammonium salt of the 4-benzoylacetylamino-1:1'-azobenzene-4'-sulfonic acid precipitated by addition of sodium chloride. It is filtered and dried. It forms a brown powder which is fairly difficultly soluble in cold water. The starting product of this example may be obtained in an analogous way to that of Example 5.

Example 7

34.1 parts of 4-acetoacetylamino-4'-hydroxy-1:1'-azobenzene-3'-carboxylic acid are dissolved in 100 parts of water and 22 parts of 30 per cent. sodium hydroxide solution. 20 parts of ortho-chlorobenzoyl chloride are introduced in portions within ½ hour with cooling with ice water to 0–5° C. and good stirring and at the same time about 17 parts of 30 per cent. sodium hydroxide solution so that the reaction always remains alkaline to phenol phthalein. Stirring is continued for a further 4 hours at 0–5° C. and then so much 10 per cent. hydrochloric acid is poured in that the reaction becomes weakly acid to Congo. Now 80 parts of 20 per cent. ammonia solution are poured in all at once and the whole heated for 5 hours to 50° C. From the clear solution with progressive hydrolysis the ammonium salt of the 4-ortho-chlorobenzoylacetylamino - 4' - hydroxy - 1:1' - azobenzene-3'-carboxylic acid precipitates. The deposition is completed by addition of sodium chloride and the product is filtered and dried. The ammonium salt forms a brown powder.

Example 8

40.4 parts of acetoacetyl-dehydrothio-paratoluidine sulfonic acid of the formula

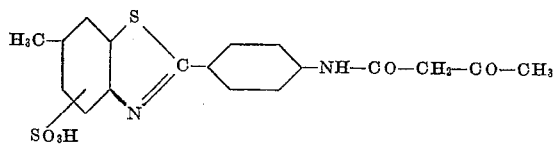

are suspended in 150 parts of water and 20 parts of 30 per cent. sodium hydroxide solution and cooled with ice water to 0–5° C. 16 parts of α-furoyl chloride are added in portions within ½ hour with good stirring, the reaction being maintained continuously alkaline to phenol phthalein by the addition of about 20 parts of 30 per cent. sodium hydroxide solution. With progressive condensation a clear solution is obtained. After about 4 hours it is treated with 10 per cent. hydrochloric acid to produce a weakly acid reaction to Congo, to the suspension produced 100 parts of 20 per cent. ammonia solution are added and the solution heated to 50° C. This temperature is maintained for 4–5 hours. The α-furoylacetyl-dehydrothio-para-toluidine sulfonic acid separates from the clear solution within this time as ammonium salt of the formula

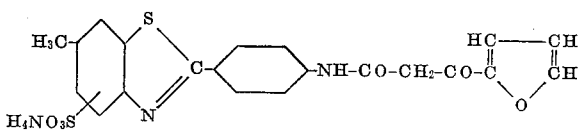

in a crystalline light brown form. It is filtered and dried.

What we claim is:

1. A process for the manufacture of monoacyl acetyl compounds of primary amines, which comprises reacting at a temperature within the range from about 0 to 30° C. in an aqueous non-acid medium a chloride of a cyclic carboxylic acid with an acetoacetyl compound of a primary cyclic amine which contains in its molecule at least one water-solubilizing acid group, and then hydrolyzing the so-obtained diacyl acetyl compound in an alkaline medium until $H_3C\text{—}CO\text{—}$ groups are split off.

2. A process for the manufacture of monoacyl acetyl compounds of primary amines, which comprises reacting at a temperature within the range from about 0 to 30° C. in an aqueous non-acid medium a chloride of an aromatic carboxylic acid with an acetoacetyl compound of a primary cyclic amine which contains in its molecule at least one water-solubilizing acid group, and then hydrolyzing the so-obtained diacyl acetyl compound in an alkaline medium until $H_3C\text{—}CO\text{—}$ groups are split off.

3. A process for the manufacture of monoacyl acetyl compounds of primary amines, which comprises reacting at a temperature within the range from about 0 to 30° C. in an aqueous non-acid medium a chloride of a cyclic carboxylic acid with an acetoacetyl compound of the formula

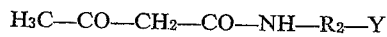

wherein Y stands for a water-solubilizing acid group and $R_2$ stands for an arylene radical, and then hydrolyzing the so-obtained diacyl acetyl compound in an alkaline medium until $H_3C\text{—}CO\text{—}$ groups are split off.

4. A process for the manufacture of monoacyl acetyl compounds of primary amines which comprises reacting at a temperature within the range from about 0 to 30° C. in an aqueous non-acid medium one molecular proportion of the dichloride of an aromatic dicarboxylic acid with two molecular proportions of an acetoacetyl compound of the formula

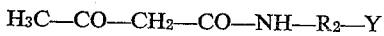

wherein Y stands for a water-solubilizing acid group and $R_2$ stands for an arylene radical, and then hydrolyzing the so-obtained diacyl acetyl compound in an alkaline medium until $H_3C\text{—}CO\text{—}$ groups are split off.

5. A process for the manufacture of monoacyl acetyl compounds of primary amines, which comprises reacting at a temperature within the range from about 0 to 30° C. in an aqueous non-acid medium two molecular proportions of the chloride of a cyclic monocarboxylic acid with one molecular proportion of an acetoacetyl compound of the formula

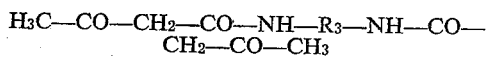

wherein $R_3$ stands for an aromatic radical containing at least one water-solubilizing group, and then hydrolyzing the so-obtained diacyl acetyl compound in an alkaline medium until $H_3C\text{—}CO\text{—}$ groups are split off.

6. A process for the manufacture of a monoacyl acetyl compound of a primary amine, which comprises reacting at a temperature within the range from about 0 to 30° C. in an aqueous non-acid medium benzoyl chloride with 1-acetoacetylamino-benzene-4-sulfonic acid, and then hydrolyzing the so-obtained diacyl-acetyl compound in an alkaline medium until the $H_3C\text{—}CO\text{—}$ group is split off.

7. A process for the manufacture of a monoacyl acetyl compound of a primary amine, which comprises reacting at a temperature within the range from about 0 to 30° C. in an aqueous non-acid medium benzoyl chloride with 1 - acetoacetylamino - 2 - methoxybenzene - 5 - sulfonic acid, and then hydrolyzing the so-obtained diacyl-acetyl compound in an alkaline medium until the $H_3C\text{—}CO\text{—}$ group is split off.

8. A process for the manufacture of a monoacyl acetyl compound of a primary amine, which comprises reacting at a temperature within the range from about 0 to 30° C. in an aqueous non-acid medium one molecular proportion of terephthalic acid dichloride with two molecular proportions of 1-acetoacetylamino-benzene-4-sulfonic acid, and then hydrolyzing the so-obtained diacyl acetyl compound in an alkaline medium until $H_3C\text{—}CO\text{—}$ groups are split off.

9. A process for the manufacture of a monoacyl acetyl compound of a primary amine which comprises reacting at a temperature within the range from about 0 to 30° C. in an aqueous non-acid medium two molecular proportions of 4:4'-di-(acetoacetylamino)-stilbene-2:2'-disulfonic acid, and then hydrolyzing the so-obtained diacyl acetyl compound in an alkaline medium until $H_3C\text{—}CO\text{—}$ groups are split off.

10. A process for the manufacture of a monoacyl acetyl compound of a primary amine, which comprises reacting at a temperature within the range from about 0 to 30° C. in an aqueous non-acid medium benzoyl chloride with 4-acetoacetylamino-4'-hydroxy-1:1'-azobenzene-3'-carboxylic acid, and then hydrolyzing the so-obtained diacyl-acetyl compound in an alkaline medium until the $H_3C$—CO— group is split off.

References Cited in the file of this patent

UNITED STATES PATENTS

| | | |
|---|---|---|
| 1,594,867 | Zitscher | Aug. 3, 1926 |
| 1,998,563 | Stusser | Apr. 23, 1935 |
| 2,304,820 | Hanford | Dec. 15, 1942 |
| 2,328,353 | Mackenzie | Aug. 31, 1943 |
| 2,570,116 | Gunther | Oct. 2, 1951 |

FOREIGN PATENTS

| | | |
|---|---|---|
| 258,583 | Switzerland | June 1, 1949 |
| 264,292 | Switzerland | Jan. 3, 1950 |
| 264,488 | Switzerland | Jan. 15, 1950 |
| 266,368 | Switzerland | Apr. 17, 1950 |

OTHER REFERENCES

Dieckmann et al.: Berichte, vol. 37, pp. 4627–4631 (1904).